Aug. 2, 1927.
C. HUNT
1,637,416
FEEDING OR CONDUCTING TUBE FOR AGRICULTURAL DRILLS OR CULTIVATORS
Filed Feb. 24, 1923
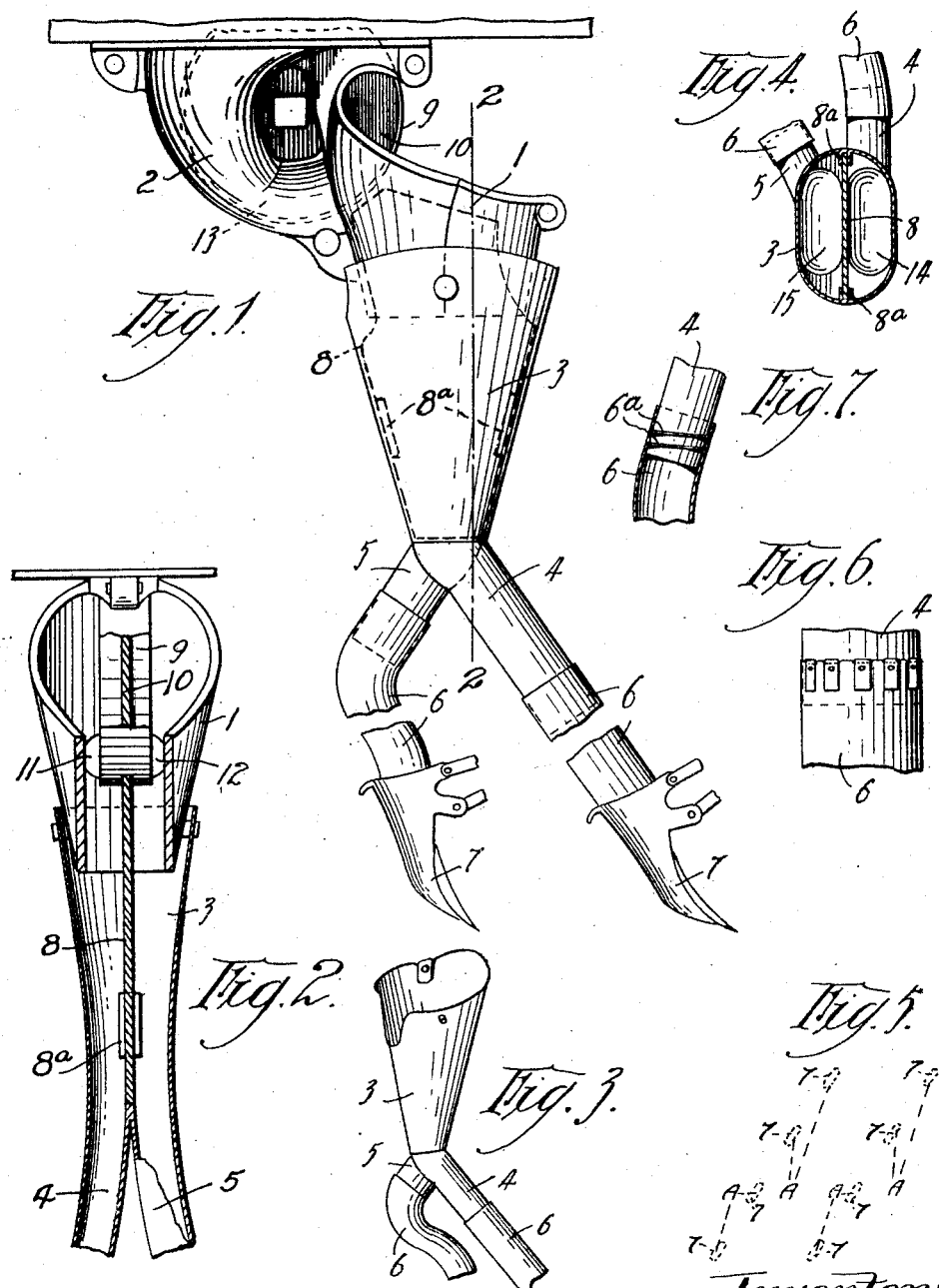
Inventor:
Clarence Hunt Patented Aug. 2, 1927.

1,637,416

UNITED STATES PATENT OFFICE.

CLARENCE HUNT, OF BEULAH WEST, VICTORIA, AUSTRALIA.

FEEDING OR CONDUCTING TUBE FOR AGRICULTURAL DRILLS OR CULTIVATORS.

Application filed February 24, 1923, Serial No. 620,945, and in Australia October 28, 1922.

This invention has been devised to provide an improved feeding or distributing tube of that type employed in machines for drilling and sowing seed such as wheat, barley, maize and other grain, or other seed which may be required to be planted. The seed may be sown with or without a fertilizing mixture. The invention is particularly useful in sowing wheat and will be so described herein, but it is to be understood that the invention is not limited thereto but as before stated may be used for sowing other seeds or the like.

One of the objects of this invention is to provide apparatus capable of being adjusted to enable the distance known as the clearance between the sowing rows or drills to be regulated or adjusted, i. e. reduced or increased as desired, in the former instance permitting a more compact or close crop to be grown within a given area or acerage than at present, and by doing so largely increasing the yield of grain thereof, and further the density of the crop so produced greatly discourages the development of weeds and other rubbish, in most instances preventing the growth thereof with the result that a full development is allowed of the grain during its growing, thus considerably enhancing the value of the grain when harvested.

Another object of this invention is to provide apparatus to ensure during drilling and sowing operations regularity and certainty of distribution of the wheat and accuracy of sowing thereof. Another object of the invention is to provide apparatus to permit simultaneous feeding from the one distributing point of the wheat and fertilizer to two or more hoes, discs or adjacent to two or more types of a cultivator.

With the present machines of this class of drill or cultivator provision is made for the employment of a certain number of sowing hoes, and it is not possible to add to their number to permit increased efficiency of the machine.

In this invention a machine of corresponding dimensions and the same number of individual feed apparatus will be employed, but additional hoes are used and arranged in a manner as hereinafter described, to enable a maximum working efficiency to be obtained i. e. a machine constructed according to the present arrangement of parts which will sow, say one hundred acres of land within a certain period, will be able to sow when using a two branch construction of the main or conducting tube as hereinafter referred to, approximately two hundred acres of land within the same period.

With all sizes of machines employing my invention the hoes can be positioned to produce the zig-zag effect so essential in preventing the accumulation of rubbish on the hose, such effect however, is not possible with the present small type of machine employing one row of hose, resulting in both inconvenience and delay occurring in clearing away such rubbish.

It will be seen from the above advantages, a machine embracing my invention is capable of performing a large amount of work and can be placed on the market at a much lower cost that the present machine in use, and further the amount of attention required to the machine will be lessened, and the power to carry out the necessary series of operations performed by the machine will be reduced, thus minimizing the hauling power required for propelling the machine, making it possible to employ less horse or other power, and in the former instance allow longer working hours.

In order that my invention may be the more easily understood, reference will be made to the accompanying sheet of drawings in which—

Figure 1 illustrates a side elevation of a portion of the feeding mechanism of an agricultural drill with a detachable conduit including a main conduit section, branch sections and terminal sections, said conduit feeding hoes as hereinafter described.

Figure 2 is a front sectional elevation of the structure shown by Figure 1, portions being shown in section on line 2—2 of Figure 1.

Figure 3 illustrates, drawn to a small scale, a detachable main conduit section with a two-branch construction of branch conduit sections.

Figure 4 is a section on line 4—4 of Figure 1, and shows a division plate within the main conduit section.

Figure 5 shows diagrammatically the relative positions of the feeding mechanism, the hoes and the branched conduit, when a two-branch conduit is used.

Figure 6 illustrates the manner of connecting an adjustable terminal conduit section of metal to a branch conduit section.

Figure 7 is a sectional view, showing the manner of attaching a flexible terminal conduit section to a branch conduit section.

Attached and suspended in any convenient manner to the adjustable delivery chute 1, pertaining to the usual or any suitable feeding apparatus 2, is a tube 3 hereinafter termed the main conduit section, it being constructed preferably of metal and of any desired length. Fixed to the lower end of the main section 3, or adjacent thereto, are two or more diverging branch conduit sections 4 and 5; in practice I have found the employment of two of such branch sections most suitable, and the invention will be so described and illustrated. Each of the said branch sections 4 and 5 is integral with, or fixed to the main section 3, but each may be connected, or fixed to the main section in a manner to permit adjustment. Whichever construction is employed, they will rest at the required angle or incline, to permit the engagement of adjustable terminal sections 6 therewith. Each terminal section may be a length of rubber tubing, engaged with a helical thread 6$^a$ on a branch section, as shown by Figure 7. If metal terminal sections are employed, they may be engaged with the branch sections in such manner as to be free to slip endwise on the latter, to a limited extent.

Figure 6 shows suitable means for engaging a metal terminal section with a branch section. The sections are arranged to permit a free downward run for the grain on its way to hoes 7, communicating with the lower ends of the terminal sections 6. Said hoes are provided with sockets 7$^a$, loosely receiving the lower ends of the terminal section 6. The hoes are movably connected with the frame of the machine by the usual or any suitable means, which may include links 7$^b$ pivoted to ears on the hoes.

It is to be understood that I do not confine myself to any particular angle or incline of the branch sections 4 and 5, and of the terminal sections 6.

Whatever the arrangement of the conduit sections may be, it is desirable that they permit the material to flow evenly and with certainty to the discharge point, i. e. to the mouth of the hoe 7.

The sections 4 and 5 may be of any desired length, and if desired, more than two branch sections may be employed, in which case the arrangement will be such as stated before, to allow the material to freely flow and be delivered to the hoe.

Figure 5 illustrates diagrammatically the relative positions of a plurality of feed mechanisms, designated by the reference letter A, and arranged in a row, and hoes 7 arranged diagonally, the dotted lines indicating approximately the angle or incline at which the branch conduit sections 4 and 5 and the adjustable terminal sections 6 attached thereto are disposed.

If it is desired, the chute 1, and the main or conduit section 3, may have an internal division plate 8, held in guides 8$^a$, such plate 8 will extend vertically from the junction of the section 3 with the branch sections 4 and 5, to a position a little above the lowest portion of the rim 9 of the feed wheel 10, and also above the level of the openings 11 and 12 provided in the feed chamber 13. The division plate subdivides the chute 1 and the main conduit section 3 into two passages 14 and 15 (Figure 4), each communicating with a branch conduit section.

The solid disc of the feed wheel 10, in some instances is formed centrally within the rim 9 of such wheel, to ensure an even and accurate distribution of the grain or other material to the passages 14 and 15.

It will be understood that I may make the size of the openings 11 and 12 according to requirements.

To provide, when the division plate is employed in the manner above stated, the necessary width or clearance of the passage way at the jointings of the main section 3 and branch sections 4 and 5, I reduce the incline of the sides of the section 3 and preferably connect the respective branch sections as shown in Figure 4.

I would have it understood that I do not arbitrarily confine myself to the hereinbefore mentioned arrangement of parts as same may be amplified or modified to suit local requirements and the type of machine in which it may be installed.

Claims—

1. In a machine for continuously sowing seed, the combination of a feeding wheel mounted to rotate about a substantially horizonal axis and having a central disc or web and a peripheral rim that projects an equal distance laterally in opposite directions from said web, a delivery chute into which said wheel projects; the aperture in the wall of said chute through which the wheel passes having portions of equal dimensions at both sides of said web, a conduit connected to and extending downward from the delivery chute and having two terminal branches, and a removable partition extending through said conduit and into the delivery chute to provide separated passages from the feed wheel to the inlets to said branches of the conduit.

2. In a machine for continuously sowing seed, the combination of a feeding wheel mounted to rotate about a substantially horizontal axis and having a central disc or web and a peripheral rim that projects an equal distance laterally in opposite directions from said web, a delivery chute into which said wheel projects, the aperture in the wall of said chute through which the wheel passes having portions of equal dimensions at both sides of said web, a conduit connected to and extending downward from the delivery chute and having two terminal branches, and a removable partition extending through said conduit and into the delivery chute to points above the horizontal plane of the lowest portion of the rim of the feed wheel and above the level of the feed openings in the delivery chute, for the purpose described.

In testimony whereof I have signed my name to this specification.

CLARENCE HUNT.